United States Patent
Gupta et al.

(10) Patent No.: US 11,289,090 B2
(45) Date of Patent: Mar. 29, 2022

(54) SYSTEMS AND METHODS FOR ADDRESSING POSSIBLE INTERRUPTION DURING INTERACTION WITH DIGITAL ASSISTANT

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 99 days.

(21) Appl. No.: 16/806,410

(22) Filed: Mar. 2, 2020

(65) Prior Publication Data

US 2021/0272570 A1    Sep. 2, 2021

(51) Int. Cl.
*G10L 15/22*    (2006.01)

(52) U.S. Cl.
CPC ...... *G10L 15/222* (2013.01); *G10L 2015/223* (2013.01)

(58) Field of Classification Search
CPC .... G10L 15/22; G10L 2015/223; G06F 3/167
USPC .................................................. 704/251
See application file for complete search history.

(56) References Cited

U.S. PATENT DOCUMENTS

| | | | |
|---|---|---|---|
| 8,849,934 B2 * | 9/2014 | Mandre | H04L 51/046 709/206 |
| 9,223,464 B2 * | 12/2015 | Mandre | H04L 51/24 |
| 9,720,565 B2 * | 8/2017 | Mandre | H04L 51/046 |
| 10,162,559 B2 * | 12/2018 | Makin | G06F 3/067 |
| 10,728,762 B1 * | 7/2020 | Fisher | H04W 76/10 |
| 2014/0074483 A1 | 3/2014 | Van Os | |
| 2018/0336449 A1 | 11/2018 | Adan et al. | |

OTHER PUBLICATIONS

PCT International Search Report for International Application No. PCT/US2020/067219, dated Apr. 13, 2021 (12 pages).

* cited by examiner

*Primary Examiner* — Susan I McFadden
(74) *Attorney, Agent, or Firm* — Haley Guiliano LLP

(57) ABSTRACT

Systems and methods are described for handling interruptions during a digital assistant session between a user and a digital assistant by detecting if an interruption event is to occur during the digital assistant session. In response to detecting that the interruption event is to occur, an operation that addresses the interruption event may be caused to be performed.

10 Claims, 6 Drawing Sheets

200

| Source/Device | Interruption Event | Time | Additional Information |
|---|---|---|---|
| TV | TV Program Reminder | 7:32 PM | Bull's Game Starts Now |
| User's Calendar | Meeting Reminder | 7:35 PM | 15 Minute Reminder |
| Video Doorbell | None | | |
| User's Reminders | Reminder to Take Joey to Soccer | 8:30 PM | 5 Minute Reminder |
| Washing Machine | Wash Cycle Finished Notification | 8:06 PM | |
| Smartphone | Alarm | 11:00 PM | Set by User |
| Thermostat | None | | |

- 210 — TV
- 212 — User's Calendar
- 214 — Video Doorbell
- 216 — User's Reminders
- 218 — Washing Machine
- 220 — Smartphone
- 222 — Thermostat

| Source/Device | Interruption Event | Time | Additional Information |
|---|---|---|---|
| TV | Canceled | | |
| User's Calendar | Meeting Reminder | Automatically Snoozed to 7:36 PM | 15 Minute Reminder |
| Video Doorbell | Someone Approaching Door | 7:33 PM (Now) | |
| User's Reminders | Soccer Practice Reminder | 8:30 PM | 5 Minute Reminder |
| Washing Machine | Wash Cycle Finished Notification | 8:06 PM | |
| Smartphone | Alarm | 11:00 PM | Set by User |
| Thermostat | None | | |

FIG. 2B

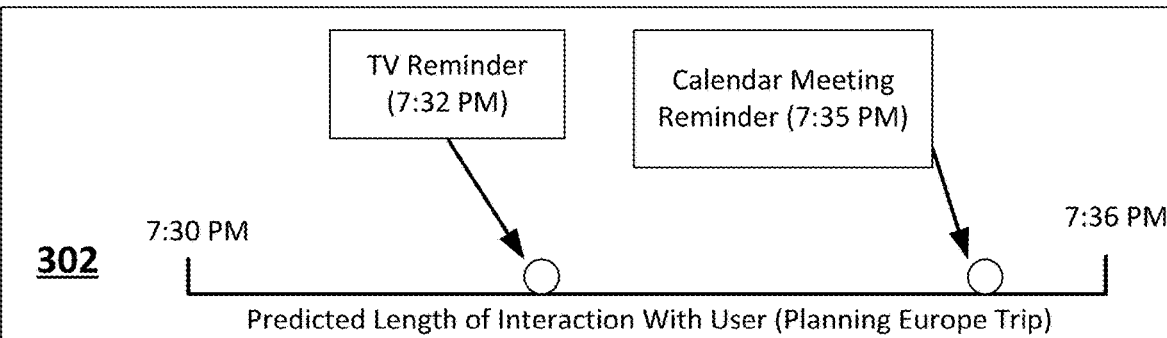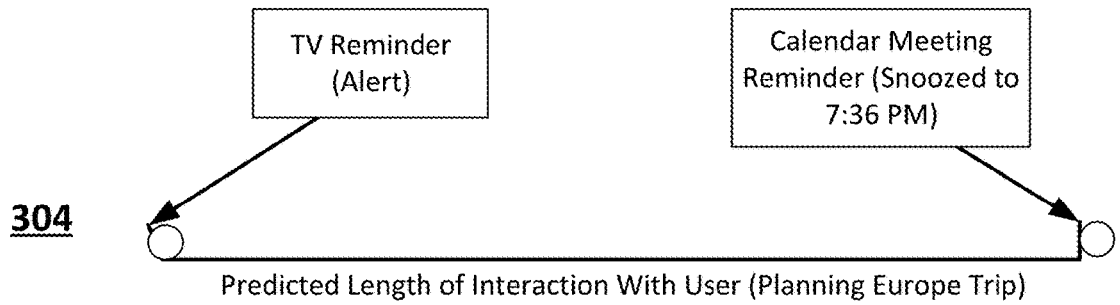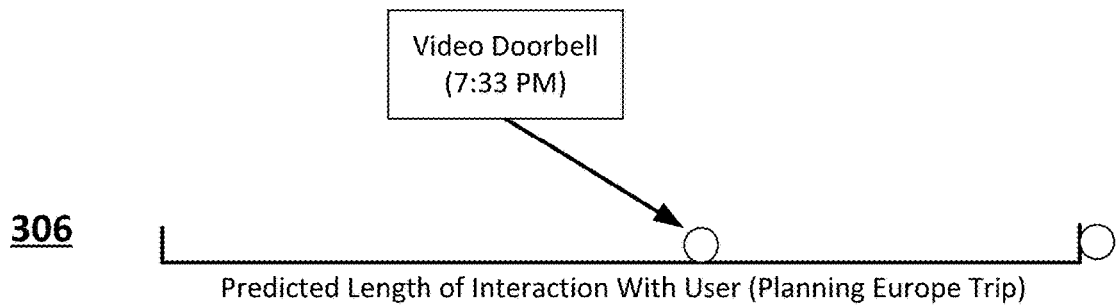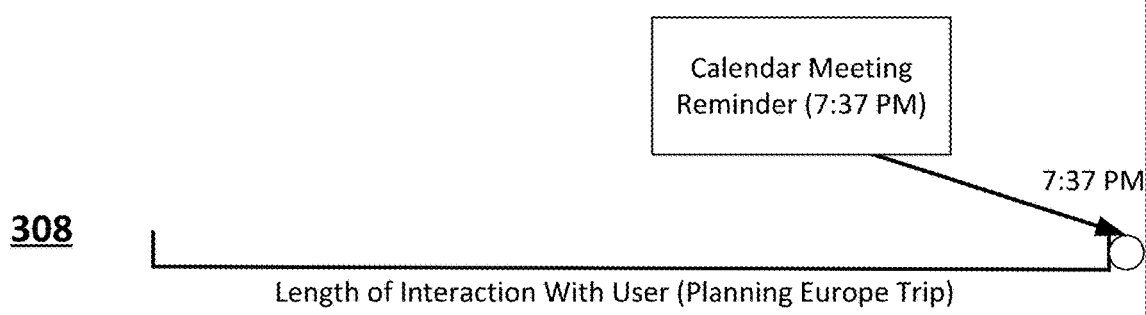
FIG. 3

1 …

SYSTEMS AND METHODS FOR ADDRESSING POSSIBLE INTERRUPTION DURING INTERACTION WITH DIGITAL ASSISTANT

BACKGROUND

The present disclosure is directed to systems and methods for addressing possible interruptions, and, more particularly, for addressing possible interruptions during an interaction with a digital assistant.

SUMMARY

Users increasingly rely on digital assistants (e.g., voice-activated assistants) for a variety of tasks. For example, a user may ask a digital assistant what the weather is, to play their favorite podcast, to help them plan a trip, to set an alarm, etc. A digital assistant may also act as a controller for a user's smart home system and control various network-connected devices or Internet of Things ("IoT") devices in the smart home system. Additionally, a digital assistant may synchronize with a user's calendar, email, and devices. As a result, a digital assistant may provide many useful notifications to a user. Although such notifications are useful to the user, they may be disruptive if they interrupt a conversation between the user and the digital assistant (i.e., a digital assistant session between the user and the digital assistant). Accordingly, it would be advantageous to minimize such interruptions, along with any other interruptions, during a digital assistant session.

Systems and methods are provided herein for handling interruptions during a digital assistant session between a user and a digital assistant by detecting if an interruption event is to occur during the digital assistant session. In response to detecting that the interruption event is to occur, an operation that addresses the interruption event is caused to be performed.

In some embodiments, a length of the digital assistant session may be predicted based on a topic of the digital assistant session. The length of the digital assistant session may be predicted based on information about the user and information about previous digital assistant sessions between users and digital assistants. For example, if the user asks the digital assistant to help them plan a trip to Europe, the length of the digital assistant session may be predicted by identifying lengths of prior digital assistant sessions having the same or similar topics (e.g., helping a user plan a trip to Europe), and predicting the length (e.g., six minutes) based on the identified lengths.

In some embodiments, interruption event data about the interruption event may be received. The detecting of if the interruption event is to occur during the predicted length of the digital assistant session may be based on the received interruption event data. For example, if the predicted length of the digital assistant session is six minutes, and interruption event data indicates that a TV reminder (an interruption event) is scheduled in two minutes, it may be detected that an interruption event is to occur.

In some embodiments, the detecting of if the interruption event is to occur may include accessing, using the digital assistant, scheduling data associated with the user. The detecting of if the interruption event is to occur during the predicted length of the digital assistant session may be based on the accessed scheduling data associated with the user. For example, if the predicted length of the digital assistant session is six minutes, and the scheduling data associated with the user indicates that a calendar meeting reminder (an interruption event) is scheduled in five minutes, it may be detected that an interruption event is to occur.

In some embodiments, the operation that addresses the interruption event may include automatically delaying the interruption event until after the digital assistant session. In some embodiments, the decision to delay an interruption event may be based on a determination of how critical the timing of the interruption event is to the user. For example, it may be determined that the TV reminder should not be automatically delayed, but that the calendar meeting reminder may be automatically delayed.

In some embodiments, in response to the predicted length being less than a threshold time, causing to be performed an operation that addresses the interruption event may include automatically delaying the interruption event until after the digital assistant session is complete. The length of the threshold time may be set based on an importance of the interruption event.

In some embodiments, the operation that addresses the interruption event may include prompting, before initiating the digital assistant session, the user to delay the digital assistant session until after the interruption event, or to delay or cancel the interruption event. For example, before initiating the digital assistant session to help the user plan a trip to Europe, the digital assistant may express "You have a TV reminder in two minutes to watch the Bull's game. Would you like to cancel or snooze the reminder or delay planning Europe trip?"

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 2A depicts a data record of status information that is received before a requested digital assistant session is initiated, in accordance with one embodiment;

FIG. 2B depicts a data record of updated status information that is received after a requested digital assistant session is initiated, in accordance with one embodiment;

FIG. 3 shows an illustrative diagram of handling interruption events timeline, in accordance with one embodiment;

DETAILED DESCRIPTION

Systems and methods are described herein for improving digital assistance and related technology by handling possible interruption events while a user is having a conversation or interacting with a digital assistant. For example, in response to the digital assistant receiving a command from the user to initiate a digital assistant session, the digital assistant may predict if an interruption event will occur during the digital assistant session. If the digital assistant predicts that an interruption event will occur, the digital assistant may perform an operation to address the interruption event, before initiating the digital assistant session. In this way, interruption events during the digital assistant session may be minimized, while still providing the user with important notifications.

Figure 1:
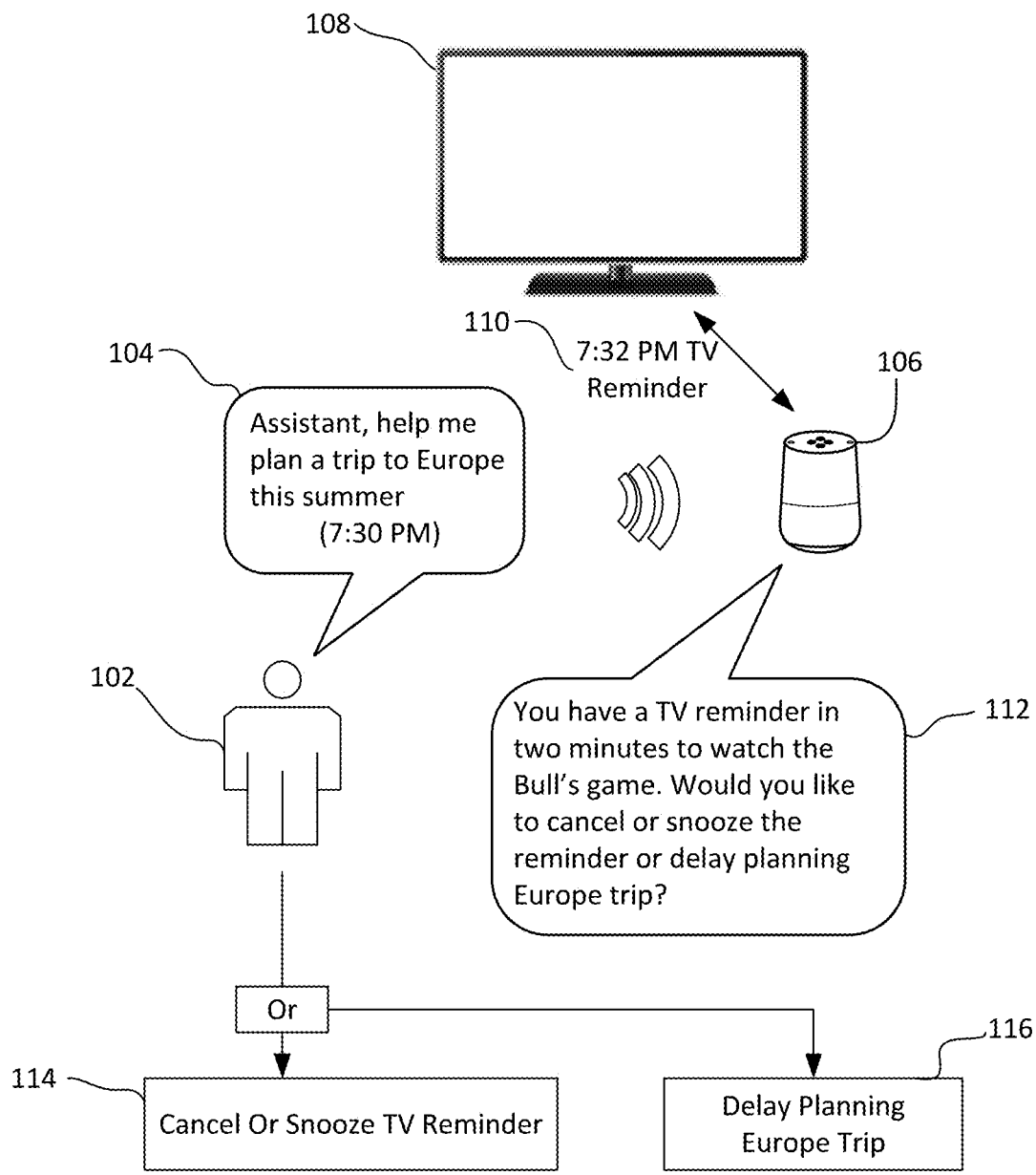
FIG. 1 shows an illustrative embodiment of handling a predicted interruption event during a digital assistant session between a user and a digital assistant, in accordance with one embodiment.

FIG. 1 shows an illustrative embodiment of handling a predicted interruption event during a digital assistant session between a user 102 and a digital assistant 106, in accordance with one embodiment. For convenience in description, a conversation between a user and a digital assistant is referred to a "digital assistant session." As shown, the digital assistant 106 may be a standalone device in a household environment. However, this is only an example, and the digital assistant 106 may be implemented on a user device (e.g., a smartphone) or any other implementation. In some embodiments, the digital assistant 106 may be implemented in a client-server implementation. The operations of the digital assistant 106 may be managed by a digital assistant application, which is described in greater detail below.

In some embodiments, the digital assistant 106 may act as a controller for various network-connected devices or IoT devices connected to a home network in the household environment. For example, as shown, the digital assistant 106 may be connected to a TV 108 (e.g., via a home network), and may be capable of communicating with and controlling the TV 108. However, this is only an example, and the digital assistant 106 may be connected with other network-connected and IoT devices (e.g., a smartphone, a thermostat, a video doorbell, a washing machine, etc.).

In the illustrative embodiment, the user 102 may initiate a conversation with the digital assistant 106 with a voice command (e.g., including a keyword that is used to activate the digital assistant 106). For example, at 7:30 PM the user 102 may say "Assistant, help me plan a trip to Europe this summer" 104. In response to receiving the voice command 104 from the user 102, the digital assistant 106 may process the voice command 104 to determine a topic of the voice command 104. For example, the digital assistant 106 may use natural language processing to determine that the topic is to help the user 102 plan a trip to Europe this summer.

The digital assistant 106 may predict a length of the requested digital assistant session based on the determined topic. To do this, the digital assistant 106 may retrieve information about the user 102. For example, the digital assistant 106 may retrieve prior digital assistant sessions between the user 102 and the digital assistant 106. In some embodiments, this information may be stored in a user profile of the user 102. This information may be automatically compiled by e.g., saving digital assistant sessions between the user 102 and the digital assistant 106. Additionally, the digital assistant 106 may access a database of other prior digital assistant sessions between users and digital assistants. In some embodiments, this information (along with the information about the user 102) may be pre-processed and classified e.g., using any appropriate data mining classification algorithm (e.g., Naïve Bayes, Stochastic Gradient Descent, K-Nearest Neighbors, Decision Tree, Random Forest, Neural Networks, Support Vector Machine, etc.). For example, the topics of the digital assistant sessions and the length of those sessions may be identified as different classes. For example, a known data mining classification algorithm can be used to classify information for digital assistant 106. After the information is classified, it may be stored in, e.g., a classified information database. Periodically, when additional conversations and user information are received, the classified information database may be updated by classifying the additional conversations and user information.

The digital assistant 106 may identify the lengths of prior digital assistant sessions having the same or similar topics as the requested digital assistant session. In some embodiments, the digital assistant 106 may use a data mining classification algorithm and the classified information database having the prior digital assistant sessions to predict the length of the requested digital assistant session. For example, in the illustrative embodiment in FIG. 1 (and as also illustrated in FIG. 3), the digital assistant 106 may predict, based on prior digital assistant sessions, that the requested digital assistant session is six minutes and zero seconds.

In some embodiments, the digital assistant 106 may give more weight to the prior digital assistant sessions of the user 102 than the prior digital assistant sessions of other users. In some embodiments, if many prior digital assistant sessions having the same or similar topics as the requested digital assistant session are identified, the respective lengths of the identified digital assistant sessions may be averaged, and the average length be selected as the predicted length of the requested digital assistant session. Additionally, in some embodiments, if the user 102 requests to play, e.g., media content having a known length (e.g., a song lasting three minutes and thirty seconds, a podcast lasting twenty-nine minutes and three seconds, etc.), the digital assistant 106 may access this information (e.g., metadata of the media content) to more accurately predict the length of the requested digital assistant session.

The digital assistant 106 may detect if there are any interruption events during the predicted length of the requested digital assistant session. To do this, the digital assistant 106 may request status information from the network-connected or IoT devices. For example, in the illustrative embodiment of FIG. 1, the digital assistant 106 may request status information from the TV 108. In response to the request for status information, the digital assistant 106 may receive status information 110 that indicates that there is a TV reminder scheduled for 7:32 PM (i.e., in two minutes). The digital assistant 106 may also receive status information from other network-connected or IoT devices (or sources). Status information may be provided in a data record such as the data records depicted in FIGS. 2A and 2B.

FIG. 2A depicts a data record of status information 200 that is received before the requested digital assistant session is initiated, in accordance with one embodiment. As shown, the status information 200 includes source/device information 202, interruption event information 204, time information 206, and additional information 208. As shown, the status information 200 may be received from a TV 210, a video doorbell 214, a washing machine 218, a smartphone 220, and a thermostat 222. Additionally, the digital assistant 106 may access the user's calendar 212 and the user's reminders 216. In some embodiments, the user's calendar 212 and the user's reminders 216 may be stored in the user profile of the user 102 or in a device of the user 102 (e.g., smartphone 220). Using the status information 200, the digital assistant 106 may detect if there are any interruption events during the predicted length of the requested digital assistant session, as described below with reference to FIG. 3

FIG. 3 shows an illustrative diagram 300 of a handling interruption events timeline, in accordance with one embodiment. As shown, the predicted length of the requested digital event session (i.e., planning Europe trip) is six minutes (i.e., from 7:30 PM-7:36 PM). In 302, the digital assistant 106 identifies two interruption events in the predicted length, namely: the TV reminder at 7:32 PM and a calendar meeting reminder at 7:35 PM.

In 304, the digital assistant 106 determines how to address the interruption events. For example, the digital assistant 106 determines whether to automatically postpone the interruption events until after the predicted length of the requested digital assistant session. To do this, the digital assistant 106 may determine how critical the timing of the interruption event is to the user 102. For example, the digital assistant 106 may consider the type of the interruption event and the additional information (e.g., additional information 208) associated with the interruption event. The digital assistant 106 may also consider the user's 102 history of responding to interruption events (e.g., whether the user 102 typically snoozes interruption events/this type of interruption event). As shown, the digital assistant 106 may determine that the calendar meeting reminder, which is a fifteen-minute reminder, may be automatically snoozed without immediately notifying the user 102. The digital assistant 106 may automatically snooze the calendar meeting reminder until after the predicted length of the requested digital assistant session (e.g., until 7:36 PM or later). The digital assistant 106 may determine that the TV reminder, which is a reminder that the Bull's game is starting, should not be snoozed. Accordingly, before initiating the requested digital assistant session, the digital assistant 106 may move the TV reminder from 7:32 to the current time and alert the user 102 about the interruption event. For example, as shown in FIG. 1, the digital assistant 106 may, in response to the user voice command 104, express: "You have a TV reminder in two minutes to watch the Bull's game. Would you like to cancel or snooze the reminder or delay planning Europe trip?" 112.

As shown in FIG. 1, the user 102 may respond to the prompt 112 by, e.g., requesting to "cancel or snooze the TV reminder" 114 until after the requested digital assistant session, or by, e.g., requesting to "delay planning the Europe trip" 116 so the user 102 can deal with the TV reminder (e.g., tune the TV 108 to the channel to watch the Bull's game). If the user 102 requests to "delay planning the Europe trip" 116, the digital assistant 106 may initiate the requested digital assistant session after a certain period of time (e.g., the time that is expected to be required for the user 102 to handle the event, the actual time required for the user 102 to handle the event, an amount of time requested by the user 102, a predetermined time—e.g., five minutes, etc.).

In 306, after the TV reminder is addressed (e.g., canceled), the digital assistant 106 may initiate the requested digital assistant session about planning the Europe trip. During the digital assistant session, the digital assistant 106 may continue to monitor status information to determine whether any additional interruption events (e.g., unscheduled interruption events) occur. For example, after initiating the requested digital assistant session, the digital assistant 106 may receive updated status information 200', as shown in FIG. 2B.

FIG. 2B depicts a data record of updated status information 200' that is received after the requested digital assistant session is initiated, in accordance with one embodiment. As shown, the updated status information 200' reflects that the TV reminder has been canceled and that the calendar meeting reminder has been automatically snoozed until 7:36 PM (i.e., after the predicted length of the digital assistant session). Additionally, the updated status information 200' includes a notification from the video doorbell 214 that someone is approaching the door (i.e., at 7:33 PM). The digital assistant 106 may determine that this interruption event should not be automatically snoozed and that the user 102 should be alerted. Accordingly, the digital assistant 106 may, after a meaningful pause in the digital assistant session, notify the user 102 that "someone is approaching the door" or "someone is at the door." That is, the digital assistant 106 may very briefly delay the notification to avoid e.g., disrupting the digital assistant session in the middle of a sentence. Alternatively, in response to the visitor ringing the video doorbell, the digital assistant 106 may simply allow the video doorbell 214 to ring (or relay the notification or video feed from the video doorbell 214 to the user 102).

After the interruption event of the video doorbell 214 is addressed, the digital assistant 106 may resume the digital assistant session with the user 102. In 308, once the digital assistant session is complete, the digital assistant 106 may notify the user 102 of the calendar meeting reminder. Due to the unexpected delay of the video doorbell 214, or if the digital assistant session extended longer than expected, the notification for the calendar meeting reminder may be delayed until 7:37 PM (e.g., instead of the originally rescheduled time of 7:36 PM). In some embodiments, if the digital assistant session extends for a length of time that is longer than the time the calendar meeting reminder should continue to be snoozed, the digital assistant 106 may pause the session and notify the user 102 of the calendar meeting reminder.

Figure 4:
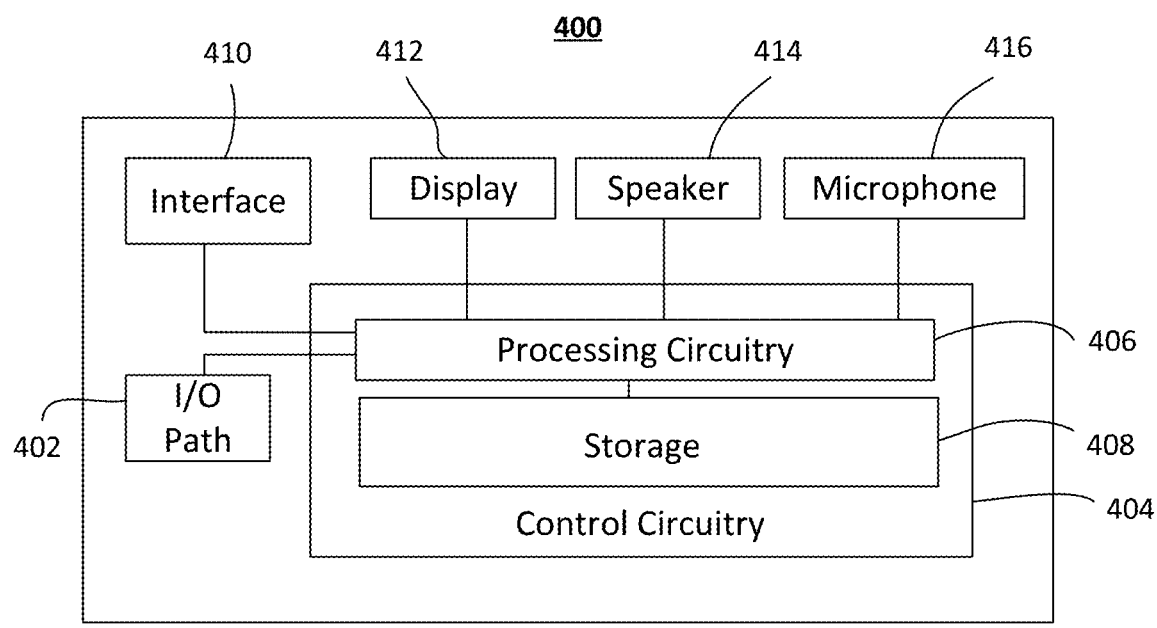
FIGS. 4-5 describe exemplary devices, systems, servers, and related hardware for handling a predicted interruption event during a digital assistant session between a user and a digital assistant, in accordance with one embodiment.
Figure 5:
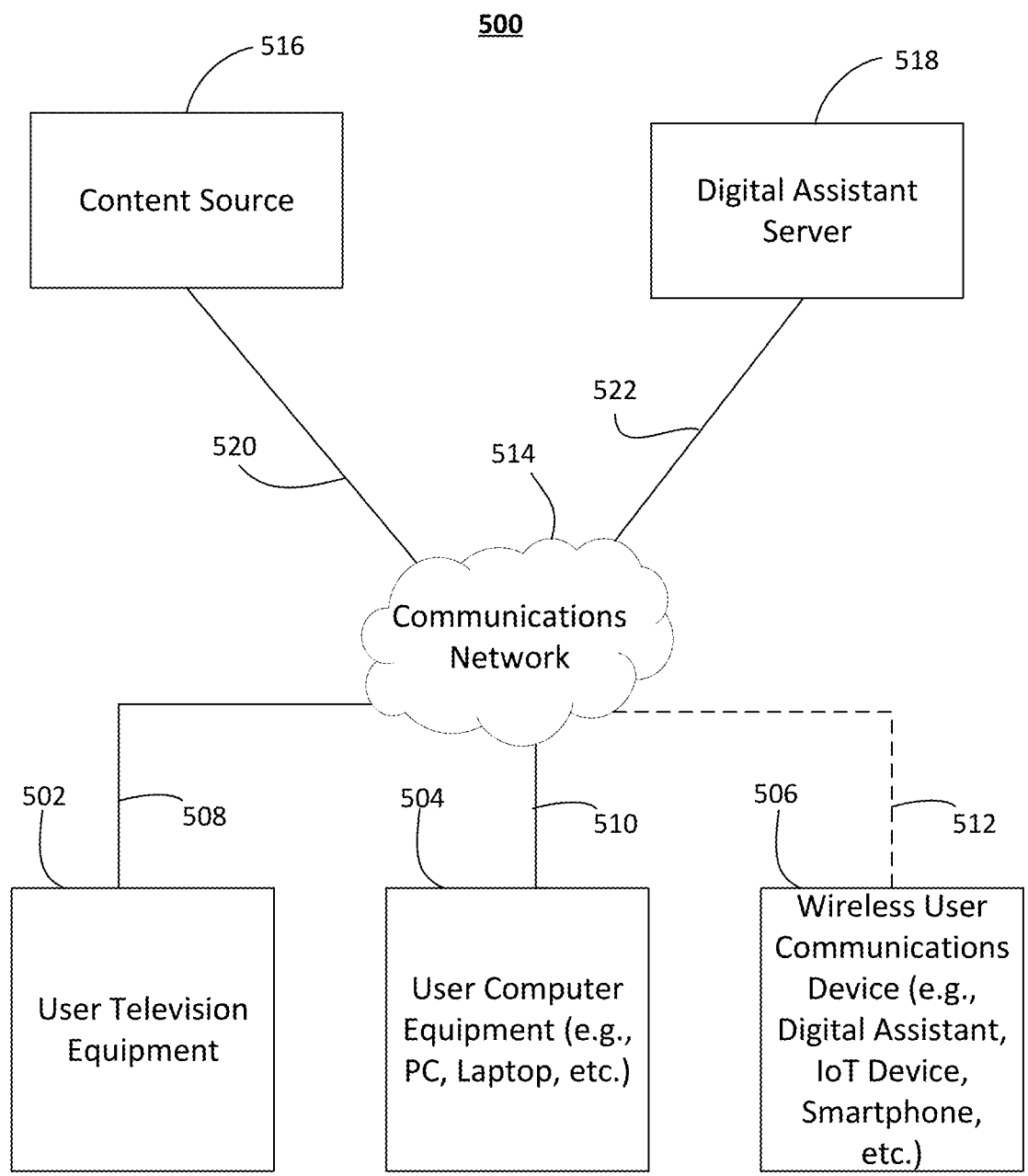

FIGS. 4-5 describe exemplary devices, systems, servers, and related hardware for handling a predicted interruption event during a digital assistant session between a user and a digital assistant, in accordance with one embodiment. FIG. 4 shows a generalized embodiment of a user equipment device 400, in accordance with one embodiment. The user equipment device 400 may be a more detailed version of the digital assistant 106 or the other, more specific implementations of the devices discussed below in connection with FIG. 5.

The user equipment device 400 may receive content and data via input/output (hereinafter "I/O") path 402. The I/O path 402 may provide audio content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths, but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 404 executes instructions for a digital assistant application stored in memory (i.e., the storage 408). Specifically, the control circuitry 404 may be instructed by the digital assistant application to perform the functions discussed above and below. For example, the digital assistant application may provide instructions to the control circuitry 404 to process and interpret voice commands received from a microphone 416, and to respond to these voice commands such as by, for example, transmitting the commands to a central server or retrieving information from the Internet, both of these being sent over the I/O path 402. In some implementations, any action performed by the control circuitry 404 may be based on instructions received from the digital assistant application.

In client-server based embodiments, the control circuitry 404 may include communications circuitry suitable for communicating with a digital assistant server or other networks or servers. The instructions for carrying out the above-mentioned functionality may be stored on the digital assistant server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 408 may be used to store various types of content described herein. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and downconverting content into the preferred output format of the user equipment device 400. The control circuitry 404 may also include digital-to-analog converter circuitry and analog-to-digital converter circuitry for converting between digital and analog signals. The tuning and encoding circuitry may be used by the user equipment device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the user equipment device 400, the tuning and encoding circuitry (including multiple tuners) may be associated with the storage 408.

The user 102 may utter instructions to the control circuitry 404 which are received by the microphone 416. The microphone 416 may be any microphone (or microphones) capable of detecting human speech. The microphone 416 is connected to the processing circuitry 406 to transmit detected voice commands and other speech thereto for processing.

The user equipment device 400 may optionally include an interface 410. The interface 410 may be any suitable user interface, such as a remote control, mouse, trackball, keypad, keyboard, touch screen, touchpad, stylus input, joystick, or other user input interfaces. A display 412 may be provided as a stand-alone device or integrated with other elements of the user equipment device 400. For example, the display 412 may be a touchscreen or touch-sensitive display. In such circumstances, the interface 410 may be integrated with or combined with the microphone 416. When the interface 410 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 410 may be HDTV-capable. In some embodiments, the display 412 may be a 3D display.

The interface 410 may, for example, display the text of any audio emitted by the user equipment device 400. For instance, with reference to FIG. 1, when digital assistant 106 emits (via speaker 414) "You have a TV reminder in two minutes to watch the Bull's game. Would you like to cancel or snooze the reminder or delay planning Europe trip?", its display interface 410 may project those same words in written form.

The speaker (or speakers) 414 may be provided as integrated with other elements of user equipment device 400 or may be a stand-alone unit. The speaker 414 is connected to the processing circuitry 406 to emit verbal responses to the user 102 voice queries. More specifically, voice queries from the user 102 are detected by the microphone 416 and transmitted to the processing circuitry 406, where they are translated into commands according to digital assistant software stored in the storage 406. The software formulates a query corresponding to the commands, and transmits this query to, for example, a search engine or other Internet resource over the I/O path 402. Any resulting answer is received over the same path 402, converted to an audio signal by the processing circuitry 406, and emitted by the speaker 414 as an answer to the voice command uttered by the user 102.

The user equipment device 400 of FIG. 4 can be implemented in system 500 of FIG. 5 as user television equipment 502, user computer equipment 504, a wireless user communications device 506, or any other type of user equipment suitable for conducting an electronic search and displaying results thereof. For example, the user equipment device 400 may be incorporated into the TV 108, i.e., the user television equipment 502. User equipment devices may be part of a network of devices. Various network configurations of devices may be implemented and are discussed in more detail below.

In the system 500, there is typically more than one of each type of user equipment device but only one of each is shown in FIG. 5 to avoid overcomplicating the drawing. In addition, a user may utilize more than one type of user equipment device and more than one of each type of user equipment device.

The user equipment devices may be coupled to communications network 514. Namely, the user television equipment 502, the user computer equipment 504, and the wireless user communications device 506 are coupled to the communications network 514 via communications paths 508, 510, and 512, respectively. The communications network 514 may be one or more networks including the Internet, a mobile phone network, mobile voice or data network (e.g., a 4G or LTE network), cable network, public switched telephone network, or other types of communications network or combinations of communications networks. The paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. The path 512 is drawn with dotted lines to indicate that in the exemplary embodiment shown in FIG. 5 it is a wireless path and the paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with the paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via the communications network 514.

The system 500 also includes content source 516, and digital assistant server 518, which can be coupled to any number of databases providing information to the digital assistant 106 in FIG. 1. The content source 516 represents any computer-accessible source of content, such as a storage for audio content, metadata, or, e.g., information about prior digital assistant sessions. The digital assistant server 518 may store and execute various software modules for implementing the digital assistant functionality of the digital assistant 106. In some configurations, these modules may include natural language interface, information retrieval, search, machine learning, and any other modules for implementing functions of a digital assistant. Such modules and functions are known.

Figure 6:
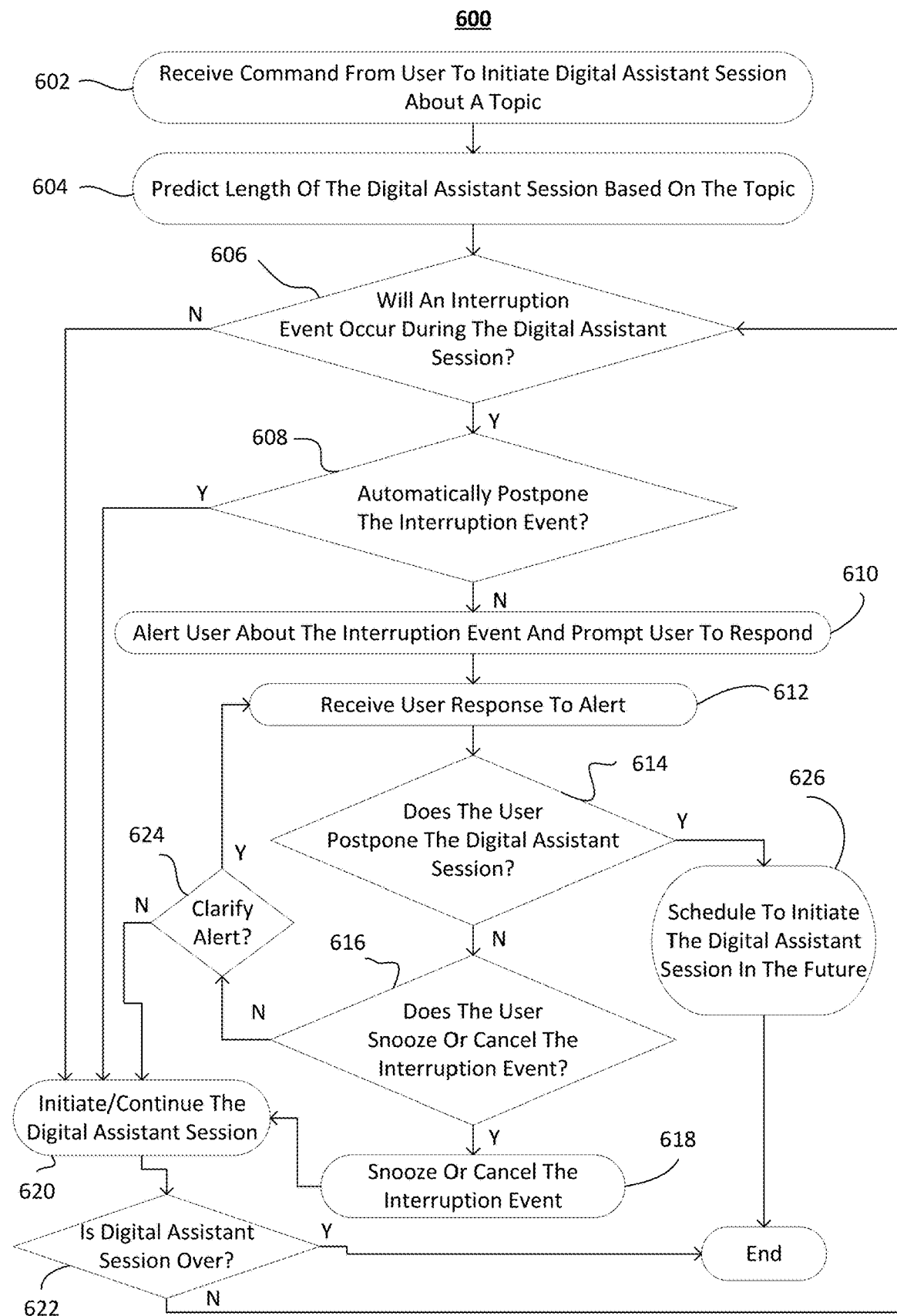
FIG. 6 is a flowchart of illustrative steps for handling a predicted interruption event during a digital assistant session between a user and a digital assistant, in accordance with one embodiment.

FIG. 6 is a flowchart of illustrative steps for handling a predicted interruption event during a digital assistant session between a user and a digital assistant, in accordance with one embodiment. For example, the digital assistant application implementing process 600 may be executed by the control circuitry 404 of the user equipment device 400. In some embodiments, instructions for executing process 600 may be encoded onto a non-transitory storage medium (e.g., the storage 408) as a set of instructions to be decoded and executed by processing circuitry (e.g., the processing circuitry 406). Processing circuitry may, in turn, provide instructions to other sub-circuits contained within control circuitry 404, such as the encoding, decoding, encrypting, decrypting, scaling, analog/digital conversion circuitry, and the like. It should be noted that the process 600, or any step thereof, could be performed on, or provided by, any of the devices shown in FIGS. 1 and 4-5.

Process 600 begins at step 602, when the user equipment device 400 receives a command (e.g., a voice command) from a user to initiate a digital assistant session about a topic. For example, audio of the command may be detected by the microphone 416. The digital assistant application (e.g., via the control circuitry 404) may convert the received audio of the command to text and use natural language processing to identify a topic of the command.

At step 604, the digital assistant application (e.g., via the control circuitry 404) may predict a length of the requested digital assistant session based on the identified topic. For example, the control circuitry 404 may acquire, from a server or database (e.g., the storage 408), information about prior digital assistant sessions (e.g., of the user and/or of other users). Using this acquired information, the control circuitry 404 may identify prior digital assistant sessions having the same or similar topics as the requested digital assistant session, and predict the length of the requested digital assistant session based on the lengths of the identified prior digital assistant sessions. Additionally or alternatively, if the command from the user is to play, e.g., media content, the control circuitry 404 may acquire, from a server or database (e.g., the content source 516 via the communications network 514), metadata indicating the length of the media content. The control circuitry 404 may use this metadata to more accurately predict the length of the requested digital assistant session.

At step 606, the digital assistant application (e.g., via the control circuitry 404) may detect whether an interruption event will occur during the predicted length of the digital assistant session. For example, the control circuitry 404 may receive, from network-connected or IoT devices or sources (e.g., television equipment 502, the user computer equipment 504, and the wireless user communications device 506), status information (e.g., FIGS. 2A and 2B) of the devices or sources. In some embodiments, the control circuitry 404 may initiate a request for the status information, and in other embodiments, the status information may be sent periodically to the control circuitry 404 or upon a change in the status of one of the devices or sources. The status information may include times of interruption events. If an interruption event is not predicted to occur during the length of the requested digital assistant session ("N" at 606), the control circuitry 404 may proceed to step 620 and initiate the digital assistant session. Otherwise, ("Y" at 606), the control circuitry 404 may proceed to step 608.

At step 608, the digital assistant application (e.g., via the control circuitry 404) may determine if the predicted interruption event may be automatically postposed without notifying the user based on, e.g., how critical the timing of the interruption event is. If the control circuitry 404 determines that the predicted interruption event may be automatically postposed ("Y" at 608), the control circuitry 404 may automatically postpose the predicted interruption event (e.g., until after the predicted length of the requested digital assistant session), and proceed to step 620 and initiate the digital assistant session. Otherwise, ("N" at 608), the control circuitry 404 may proceed to step 610.

At step 610, the digital assistant application (e.g., via the control circuitry 404) may alert the user about the interruption event (e.g., via the speaker 414 and/or the display 412). The control circuitry may also inquire if the user would like to snooze/cancel the interruption event or delay the requested digital assistant session to address the interruption event.

At step 612, the digital assistant application (e.g., via the control circuitry 404) may receive a user response from the user (e.g., via microphone 416 or the interface 410).

At step 614, the digital assistant application (e.g., via the control circuitry 404) may analyze the user's response to determine if the user wishes to postpone the requested digital assistant session to address to interruption event. If so ("Y" at 614), the control circuitry 404 schedules to initiate the requested digital assistant session in the future (e.g., after the user addresses the interruption event) at step 626. Otherwise ("N" at 614), the control circuitry may proceed to step 616.

At step 616, the digital assistant application (e.g., via the control circuitry 404) may analyze the user's response to determine if the user wishes to snooze or cancel the interruption event. If so ("Y" at 616), control circuitry 404 may snooze or cancel the interruption event, at step 618, and proceed to step 620 and initiate the digital assistant session.

At step 624, the digital assistant application (e.g., via the control circuitry 404) may determine if the alert (and prompt) provided in step 610 needs to be clarified. For example, if the control circuitry 404 is not able to determine the intention of the user response to the alert, the control circuitry may determine that the alert needs to be clarified ("Y" at 624), and may clarify the alert and proceed back to step 612 to wait for a user response to the clarified alert. Otherwise ("N" at 624), the control circuitry 404 may proceed to step 620 and initiate the digital assistant session. In this situation, the control circuitry 404 may automatically postpone or cancel the interruption event or may interrupt the digital assistant session with the interruption event, depending on how critical the timing of the interruption event is or based on past behavior of the user.

After the requested digital assistant session is initiated in step 620, the control circuitry 404 may proceed to step 622 and monitor whether the initiated digital assistant is over. If so ("Y" at 622), the control circuitry 404 may end the process 700. Otherwise ("N" at 622), the control circuitry may proceed back to step 606 to monitor for any additional interruption events that may occur during the initiated digital assistant session (e.g., unscheduled interruption events) (FIG. 2B).

It is contemplated that the steps or descriptions of FIG. 6 may be used with any other embodiment of this disclosure. In addition, the descriptions described in relation to the algorithms of FIG. 6 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIG. 6 may be implemented on a combination of appropriately configured software and hardware, and that any of the devices or equipment discussed in relation to FIGS. 1 and 4-5 could be used to implement one or more portions of the process.

The processes discussed above are intended to be illustrative and not limiting such that steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method of handling interruptions during a digital assistant session between a user and a digital assistant, the method comprising:
   detecting if an interruption event is to occur during the digital assistant session;
   predicting a length of the digital assistant session based on a topic of the digital assistant session;
   setting a length of a threshold time based on an importance of the interruption event; and
   in response to detecting that the interruption event is to occur, causing to be performed an operation that addresses the interruption event, wherein in response to the predicted length being less than the threshold time, causing to be performed an operation that addresses the interruption event comprises automatically delaying the interruption event until after the digital assistant session is complete.

2. The method of claim 1, wherein the detecting if the interruption event is to occur comprises accessing, using the digital assistant, scheduling data associated with the user, and
   wherein the detecting if the interruption event is to occur during the predicted length of the digital assistant session is based on the accessed scheduling data associated with the user.

3. The method of claim 1, wherein the predicting the length of the digital assistant session is further based on information about the user and information about previous digital assistant sessions between users and digital assistants.

4. The method of claim 1, wherein the operation that addresses the interruption event comprises at least one of:
   automatically delaying the interruption event until after the digital assistant session;
   prompting the user to delay the digital assistant session until after the interruption event; or
   prompting the user to delay or cancel the interruption event.

5. The method of claim 1, wherein the detecting if the interruption event is to occur comprises receiving interruption event data about the interruption event, and
   wherein the detecting if the interruption event is to occur during the predicted length of the digital assistant session is based on the received interruption event data.

6. A system for handling interruptions during a digital assistant session between a user and a digital assistant, the system comprising control circuitry configured to:

detect if an interruption event is to occur during the digital assistant session;
predicting a length of the digital assistant session based on a topic of the digital assistant session;
setting a length of a threshold time based on an importance of the interruption event; and
in response to detecting that the interruption event is to occur, cause to be performed an operation that addresses the interruption event, wherein in response to the predicted length being less than the threshold time, causing to be performed an operation that addresses the interruption event comprises automatically delaying the interruption event until after the digital assistant session is complete.

7. The system of claim 6, wherein the control circuitry is further configured to predict the length of the digital assistant session based on information about the user and information about previous digital assistant sessions between users and digital assistants.

8. The system of claim 6, wherein the operation that addresses the interruption event comprises at least one of:
automatically delaying the interruption event until after the digital assistant session;
prompting the user to delay the digital assistant session until after the interruption event; or
prompting the user to delay or cancel the interruption event.

9. The system of claim 6, wherein the control circuitry is further configured to:
receive interruption event data about the interruption event; and
detect if the interruption event is to occur during the predicted length of the digital assistant session based on the received interruption event data.

10. The system of claim 6, wherein the control circuitry is further configured to:
access scheduling data associated with the user; and
detect if the interruption event is to occur during the predicted length of the digital assistant session based on the accessed scheduling data associated with the user.

* * * * *